March 5, 1957

A. L. THURMAN 2,783,869

CONVEYOR FOR BOTTLE CASE UNLOADER

Filed Oct. 28, 1954

INVENTOR
Amos L. Thurman
BY
ATTORNEYS

March 5, 1957 A. L. THURMAN 2,783,869
CONVEYOR FOR BOTTLE CASE UNLOADER
Filed Oct. 28, 1954 2 Sheets-Sheet 2
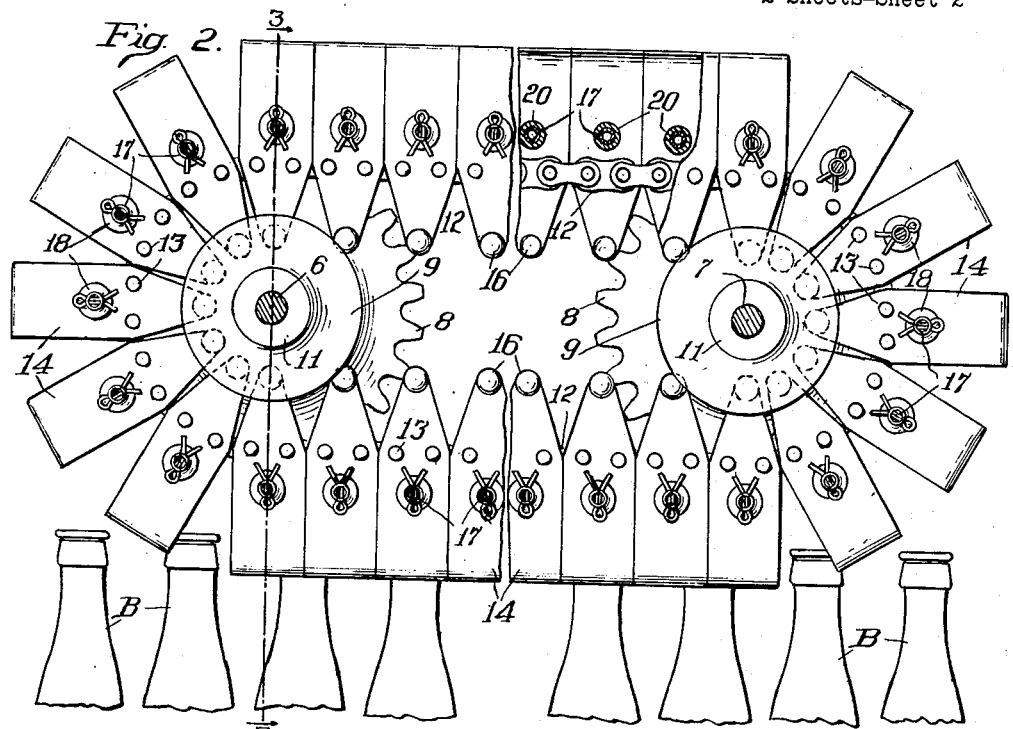
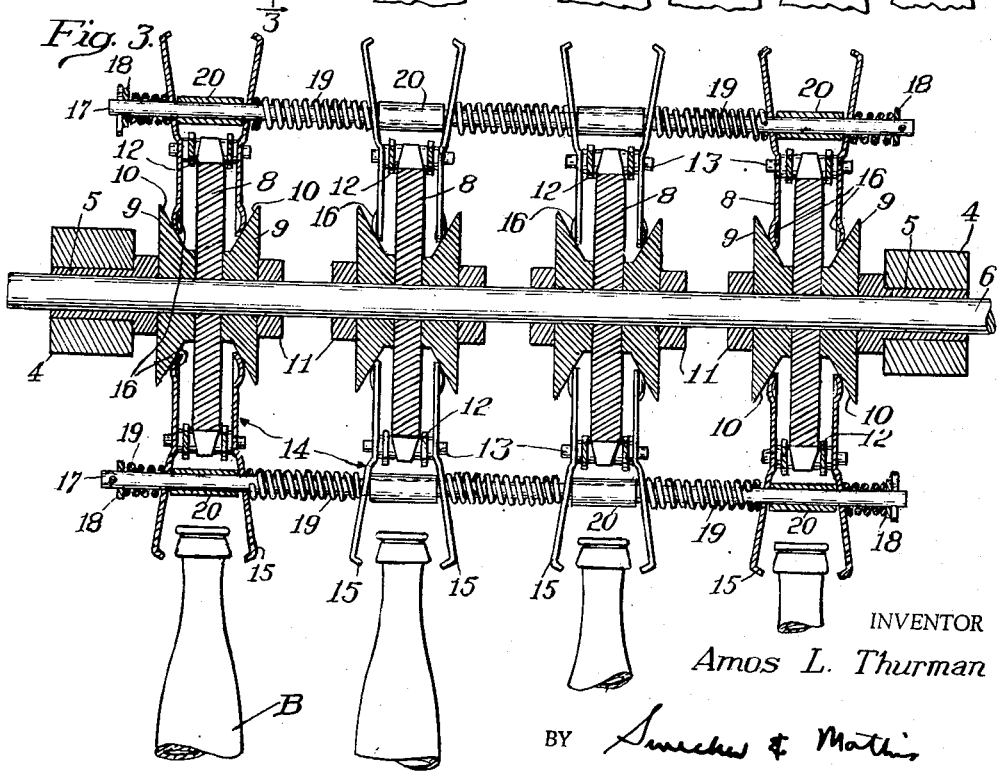
INVENTOR
Amos L. Thurman
BY
ATTORNEYS

United States Patent Office 2,783,869
Patented Mar. 5, 1957

2,783,869

CONVEYOR FOR BOTTLE CASE UNLOADER

Amos L. Thurman, Knoxville, Tenn.

Application October 28, 1954, Serial No. 465,284

8 Claims. (Cl. 198—179)

This invention relates to improvements in bottle case unloaders, of the character used for removing beverage bottles and the like from wooden cases, paper cartons, etc.

Empty bottles are ordinarily transported by wooden cases, and stand in upright positions in groups of twelve or twenty-four to the case. In some instances the bottles are also enclosed within paper cartons in which they are carried, which cartons may be set in a case. The bottles must be removed from the cases before they can be washed and refilled.

Various machines and devices have been proposed heretofore for removing bottles from cases, but these have not proven very satisfactory, and it has been the general practice to resort to hand labor for this purpose.

One object of this invention is to improve the construction of devices for removing bottles from cases automatically and to transport separately the individual bottles and the cases.

Another object of the invention is to provide a simple and effective mechanism which will function automatically to grip the individual bottles that are assembled in multiples in a case and to remove the bottles from the case automatically as the cases are advanced, discharging the cases and the bottles separately.

These objects may be accomplished, according to one embodiment of the invention, by providing an assembly of gripping members arranged in multiples, forming a continuous line of jaws on either side of the bottles in a row transversely of the case, so as to grip simultaneously all of the bottles in each row and to advance with the case, but having a relatively vertical displacement of the bottles and case for automatically removing the bottles therefrom during the advancement. Each of the gripping members may comprise a pair of jaws arranged to grip a bottle therebetween yieldably pressed against the opposite sides of the bottle and normally held in engagement therewith during the advancing movement. The pair of jaws are open, respectively, at the beginning and the end of the path of movement along the advancement of the case, first to grip the neck of the bottle and thereafter to release the bottle at the end of the path. Provision is made for guiding means to engage arms connected with the jaws of the gripping members as the gripping members pass around axes at the respective opposite ends of the unloader device, so as to open and close the jaws in timed relation with the movement thereof. Thus, the bottles can be gripped securely and automatically during passage along the unloading area and, by reason of the divergent relation of the unloading device and the bottle case conveyor, these can be withdrawn readily from the case.

This embodiment of the invention is illustrated in the accompanying drawings, in which:

Fig. 2 is a side elevation of the bottle gripping devices in assembled relation, with parts thereof broken away; and Fig. 3 is a cross section therethrough on the line 3—3 in Fig. 2.

Figure 1:
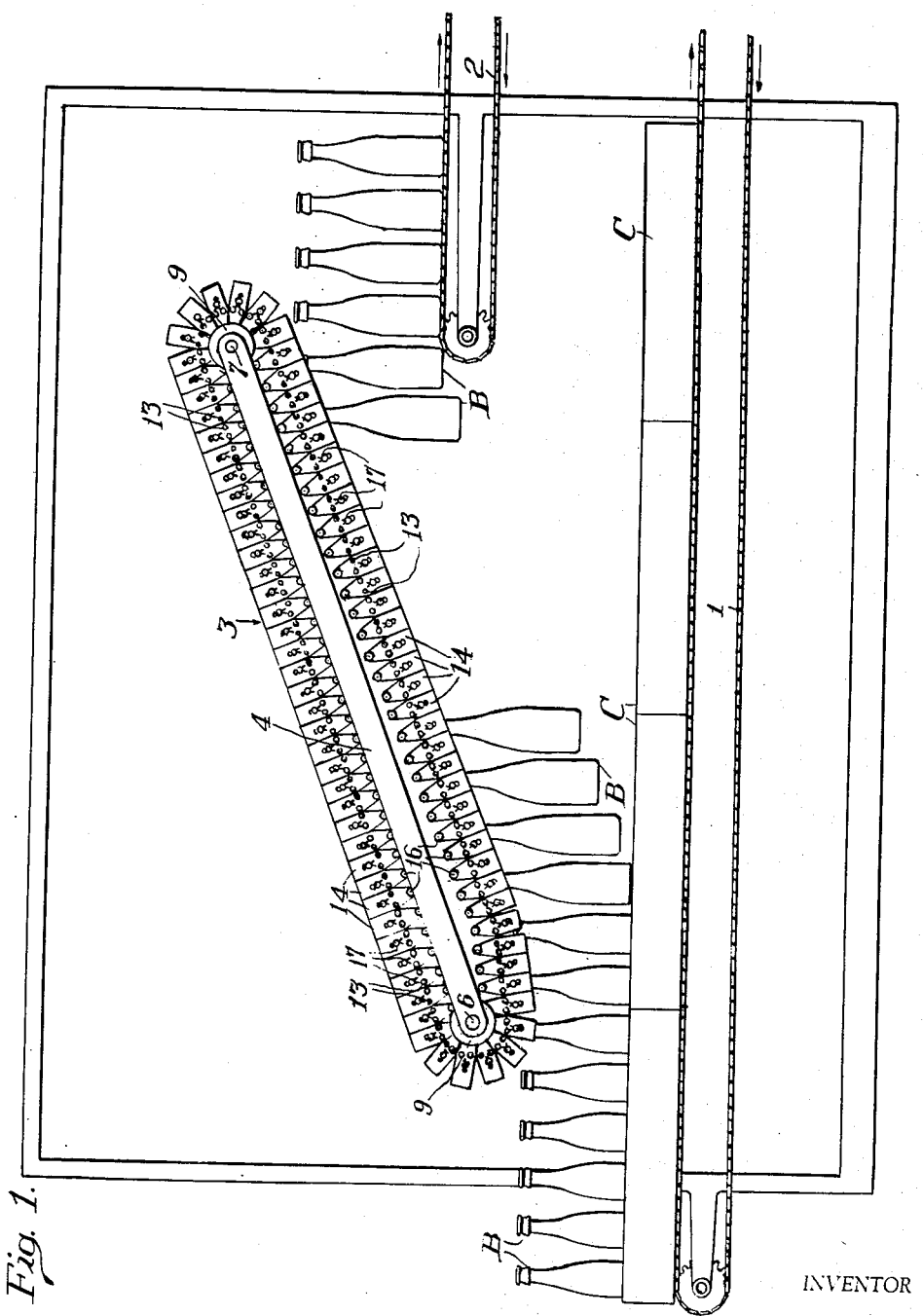
Fig. 1 is a side elevation of a bottle case unloader unit.

In the embodiment of the present invention as shown in the drawings, a continuous succession of bottle cases C are fed to the unloader device on an endless conveyor, generally indicated at 1. The conveyor 1 is continuously operated to move the cases into the unloader device and to direct the empty cases therefrom. Any suitable form of belt or chain conveyor may be used for this purpose and may be operated either intermittently or continuously. The present invention makes it possible, however, for the conveyor to be fed continuously without the necessity for stopping the feeding operation in order to remove the bottles from the cases C.

Each of the cases C usually holds either twelve or twenty-four bottles in groups of six rows, with four to a row, the rows extending transversely of each case C. The bottles are indicated at B. Usually the bottles are provided with capping sections formed as enlargements on the upper ends of the necks thereof. These enlarged rings on the necks of the bottles are utilized for gripping by a pair of jaws to lift the bottles out of the cases and to support the bottles as they are transported onto a bottle conveyor 2.

As shown in Fig. 1, the conveyors 1 and 2 are vertically displaced from each other. This is made possible either by locating the conveyor 2 at a higher elevation than the conveyor 1, although the conveyor 2 can be in horizontal alignment with the inlet end of the conveyor 1 if the latter is in a downwardly directed relation therefrom, so as to discharge the cases beneath the conveyor 2 as the bottles are lifted out of the cases and set upon the endless conveyor 2. These conveyors may be similar to each other, such as belt conveyors, and should be operated at the same linear speeds, preferably continuously, as described above.

The unloading unit is designated generally at 3, and may be either inclined, as indicated in Fig. 1, when the conveyor 2 is at a higher elevation than the discharge end of the conveyor 1, or the unloader unit can be horizontal when the conveyor 1 is in a downwardly directed relation, as shown in Fig. 2.

The unloader unit 3 comprises a frame structure, generally indicated at 4, supported in any suitable manner and preferably comprising a pair of rails spaced apart with journals 5 therein. Provision may be made for pivotally supporting the frame 4 at one end thereof and for raising and lowering the opposite end of the frame to vary the angle of inclination of the frame or the disposition thereof with respect to the incoming conveyor 1. Any suitable adjusting means may be used for this purpose, such as a chain and crank mechanism connected with the outer end of the frame.

Mounted in the journals 5 at the opposite ends of the frame 4 are cross shafts 6 and 7, respectively, located at the inlet and outlet ends of the unloader unit 3. These shafts 6 and 7 should be power operated, or at least one thereof should be driven for driving the unloading unit.

Keyed or otherwise fixed on each of the cross shafts 6 and 7, that are power driven or mounted on said shafts, are sprocket wheels 8 spaced apart lengthwise of the shafts and corresponding with the respective positions of the bottles B as presented to the unloader unit during movement of the cases C on the conveyor 1, as illustrated in Fig. 3. Each of the sprocket wheels 8 is provided on opposite sides thereof with a pair of discs 9 having inwardly directed bevelled faces, indicated at 10. The discs 9 are secured in any suitable manner against axial displacement on the corresponding shaft 6 or 7 as by stop members 11 that are fixed securely to the corresponding shaft.

Sprocket chains are shown generally at 12, one for each sprocket wheel 8, extending lengthwise of the unloader unit over the corresponding sprocket wheels on both of the shafts 6 and 7. Any suitable or desired contruction of sprocket chains may be used for this purpose, being supported upon the sprocket wheels 8 of the respective shafts 6 and 7 and extending therebetween.

Each of the sprocket chains 12 has extended pins 13 between the links thereof, as shown in Fig. 3. The pins 13 are connected with gripping members, generally indicated at 14, which are thereby connected with the sprocket chains 12 and moved thereby. A gripping member is provided for gripping a bottle B, the gripping members being arranged in rows transversely of the cases C and forming a continuous line of gripping jaws on either side of the rows of bottles and in alignment with the bottles along the cases, as will be apparent from Fig. 3.

Each of the gripping members 14 comprises a pair of jaws 15 adapted to engage the necks of the bottles B beneath the crown rings thereof for lifting and supporting the bottles during the removal thereof from the cases and for setting the bottles on the conveyor 2. The gripping members 14 are loosely connected with the sprocket chain pins 13 to permit of transverse rocking movement thereof, and the free ends of the respective gripping members 14 opposite from the jaws 15 are provided with enlargements 16 thereon in positions to bear against the bevelled faces 10 of the discs 9 to squeeze those ends of the gripping members together and thereby spread apart the jaws 15 for engaging or releasing the bottles B. The gripping members will rock on the pins 13, as pivots, to permit of this transversely spreading action.

The several gripping members arranged in a row transversely of the cases C may be held in such relation by a transverse rod 17 extending through all of the gripping members adjacent the jaws 15, with abutment means 17 on the outer ends thereof formed, as shown, of washers and cotter pins. Coiled springs 19 are sleeved over the rod 17 bearing upon the gripping members, normally tending to urge the jaws 15 of each pair inwardly toward each other into gripping relation with opposite sides of the necks of the bottles B. Sleeves 20 are loosely mounted on each rod 17 between a pair of gripping members to limit the inward swinging of these members with respect to each other. If some of the sprocket chains 12 be omitted as not required, the swinging movement of the gripping members 14 will take place about the rods 17 as the upper ends of the gripping members or the enlargements 16 thereon are pressed inward toward each other so as to separate the jaws 15, as shown in Fig. 3. Any suitable number of sprocket chains may be used, as desired, so long as the gripping members 14 are connected together by the rods 17 to move in unison.

Normally, the bottle cases are fed into the unloader device, as shown by the arrows in Fig. 1, with the bottles in the respective cases, either directly in the cases or in cardboard cartons contained therein. It is desirable to remove the bottles from the respective cases C and to allow the discharge of the empty cases at the right-hand end of the assembly, as viewed in Fig. 1. The bottles, in turn, being removed from the respective cases, are set upon an endless conveyor 2 which is continuously operated for directing the bottles therefrom to the washing machine.

As the cases of bottles reach the inlet end of the unloader unit, as viewed in Figs. 1 and 2, the gripping members 14 are moved around the axis of the shaft 6 in the direction indicated by the arrows in Fig. 2. As the enlarged projection 16 on the free ends of the gripping members 14 bear against the bevelled faces 10 of the disc 9, the jaws 15 will be opened with respect to each other, as shown in Fig. 3. These will be held in open relation until the gripping members reach the vertical plane through the axis of the shaft 6, after which the enlargements 16 will be gradually withdrawn from the bevelled faces 10 during the rectilinear travel of the corresponding members along the line of bottles. This will allow the jaws 15 gradually to close about opposite sides of each respective bottle beneath the crown ring thereon and to hold this relation of the gripping members to each bottle, clamping the bottle therebetween.

As the endless unloader unit and the conveyor 1 gradually diverge in their rectalinear travel, the bottles will be withdrawn from the cases, in the relation illustrated in Fig. 1.

The conveyor 2 underlies the discharge end of the unloader unit and receives and supports the bottles supported thereon at the points where the gripping members reach the discs 9 mounted on the shaft 7 at the discharge end of the unloader unit. The discs 9 on the shaft 7 will function, as described above, to squeeze inward on the free ends of the gripping members, thereby spreading the jaws 15 apart and allowing the bottles to drop onto the upper run of the endless conveyor 2 when the unloader unit reaches the adjacent end of the conveyor. The relation of these parts may be such that there is no appreciable length of drop of the bottles, but these are supported on the conveyor for travel thereby to the washing machine.

This forms an extremely simple and yet very effective means for removing the bottles from the cases without complexity, either of structure or of travel. It eliminates the hand operations heretofore in customary use and makes it possible for the automatic removal of the bottles in a very speedy and expeditious manner.

While the invention has been illustrated and described in one embodiment, it is recognized that variations and changes may be made therein without departing from the invention as set forth in the claims.

I claim:

1. A bottle case unloader comprising a pair of shafts, sprockets mounted on the shafts, a sprocket chain extending over the sprockets and guided thereby, a plurality of gripping units spaced lengthwise of said sprocket chain, each of the units including a pair of members on respective opposite sides of the sprocket chain and pivotally mounted thereon for swinging movement into and out of positions for embracing a bottle as the gripping units are moved into proximity to the bottles without timed relation therewith, and discs mounted on the shafts on opposite sides of the sprockets and having bevelled faces in positions for engaging the respective members of each gripping unit to move said members out of positions for embracing the bottles.

2. A bottle case unloader comprising shafts, sprockets mounted on each of the shafts, a plurality of sprocket chains extending over the sprockets and guided thereby, a plurality of gripping units spaced lengthwise of each of the sprocket chains, each of the units including a pair of members on opposite sides of the sprocket chain and pivotally supported thereby in positions for rocking movement transversely into and out of positions for embracing a bottle as the gripping units are moved into proximity to the bottles without timed relation therewith, a pair of discs mounted on each shaft on opposite sides of each of the sprockets in positions for engagement by the respective members of each gripping unit at the ends of the travel path for causing swinging movement of said members out of positions for embracing the bottles.

3. A bottle case unloader comprising shafts, sprockets mounted on each of the shafts, a plurality of sprocket chains extending over the sprockets and guided thereby, a plurality of gripping units spaced lengthwise of each of the sprocket chains, each of the units including a pair of members on opposite sides of the sprocket chain and pivotally supported thereby in positions for rocking movement transversely into and out of positions for embracing a bottle as the gripping units are moved into proximity to the bottles without timed relation therewith, a pair of discs mounted on each shaft on opposite sides of each of the sprockets in positions for engagement by the respective members of each gripping unit at the ends of the travel path for causing swinging movement of said members out of positions for embracing the bottles, the gripping units on the sprocket chains being in side-by-side relation, rods operatively connected with the gripping units of the plurality of chains and holding said units in transverse alignment.

4. A bottle case unloader comprising shafts, sprockets mounted on each of the shafts, a plurality of sprocket chains extending over the sprockets and guided thereby, a plurality of gripping units spaced lengthwise of each of the sprocket chains, each of the units including a pair of members on opposite sides of the sprocket chain and pivotally supported thereby in positions for rocking movement transversely into and out of positions for embracing a bottle as the gripping units are moved into proximity to the bottles without timed relation therewith, a pair of discs mounted on each shaft on opposite sides of each of the sprockets in positions for engagement by the respective members of each gripping unit at the ends of the travel path for causing swinging movement of said members out of positions for embracing the bottles, the gripping units on the sprocket chains being in side-by-side relation, rods operatively connected with the gripping units of the plurality of chains and holding said units in transverse alignment, sleeves telescoped over the rods between the members of each gripping unit for holding the members spaced apart, and coiled springs sleeved over the rods and bearing inwardly on the gripping members of each unit yieldably urging said members into gripping relation with a bottle.

5. A bottle case unloader comprising a plurality of endless devices arranged in side-by-side relation, a plurality of gripping units spaced lengthwise of each of said endless devices, each of said units including a pair of members pivotally connected with the endless devices and having a pair of jaws in positions for embracing a bottle as the gripping units are moved into proximity to the bottles without timed relation therewith, rods extending transversely of the endless devices and through a plurality of said gripping units connected therewith for holding said gripping units in transverse alignment with each other, and coiled springs sleeved over the rods and bearing on adjacent members of side-by-side units normally tending to urge said members into gripping relation with the bottles.

6. A bottle case unloader comprising a plurality of endless devices arranged in side-by-side relation, a plurality of gripping units spaced lengthwise of each of said endless devices, each of said units including a pair of members pivotally connected with the endless devices and having a pair of jaws in positions for embracing a bottle as the gripping units are moved into proximity to the bottles without timed relation therewith, rods extending transversely of the endless devices and having operative connection with a plurality of said gripping units connected therewith for holding said gripping units in transverse alignment with each other, said rods extending through the members of the transversely aligned gripping units, sleeves telescoped over the rods between the members of each gripping unit, and coiled springs mounted on the rods in yieldable bearing relation against the sides of the members of each gripping unit urging said jaws inwardly into positions for engagement with a bottle.

7. A bottle case unloader comprising a plurality of sprocket chains arranged side-by-side, guide sprockets for the respective chains, a plurality of gripping units spaced lengthwise of each chain, each unit including a pair of elongated members on respective opposite sides of the chain, means pivotally mounting the members on the chain for swinging movement toward and from each other at adjacent ends for gripping a bottle between the members at one end, and discs mounted on opposite sides of the sprockets and having portions in positions for engagement by the respective members at the opposite ends thereof to cause disengagement of the members with the bottles.

8. A bottle case unloader comprising a plurality of sprocket chains arranged side-by-side, guide sprockets for the respective chains, a plurality of gripping units spaced lengthwise of each chain, each unit including a pair of elongated members on respective opposite sides of the chain, means pivotally mounting at least one of the members of each unit on the chain for swinging movement toward and from the other member at adjacent ends for gripping a bottle between the members of each unit at one end, and a disc mounted beside each sprocket and having a portion in position for engagement by the pivoted member of each unit at the opposite end thereof to cause disengagement of the members from a bottle.

References Cited in the file of this patent
UNITED STATES PATENTS
2,696,927    Copping  --------------  Dec. 14, 1954